Nov. 13, 1956
H. P. HENDERSON
2,770,260
SELF-ALINING PROTECTIVE PLUG FOR TUBINGS, HOSE LINES, THREADED OPENINGS, ETC
Filed Aug. 19, 1954
2 Sheets-Sheet 2
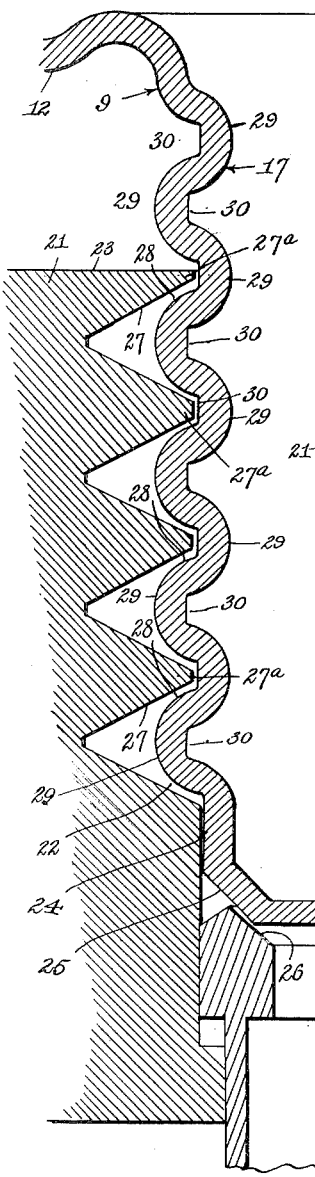
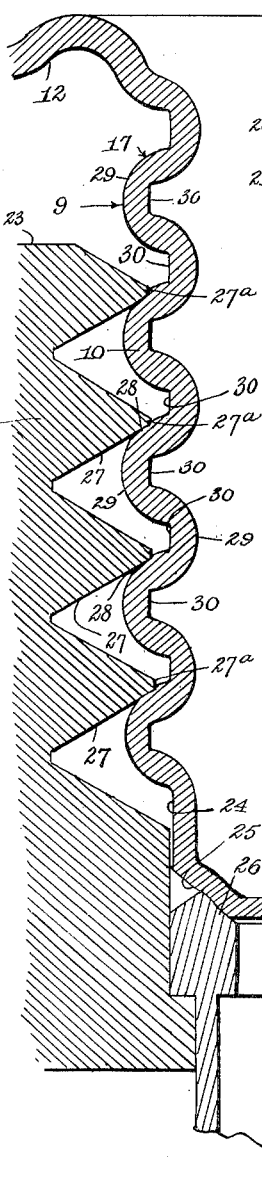
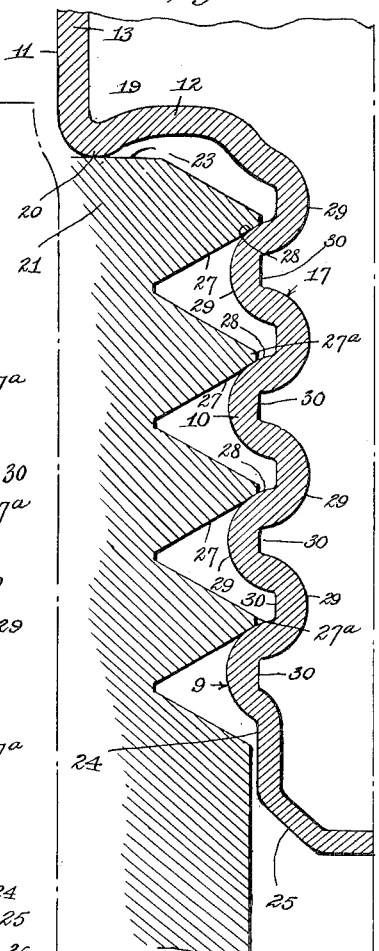
Harold P. Henderson
Inventor
By Emil Kuhart
Attorney.

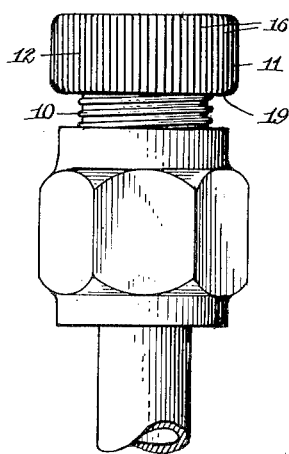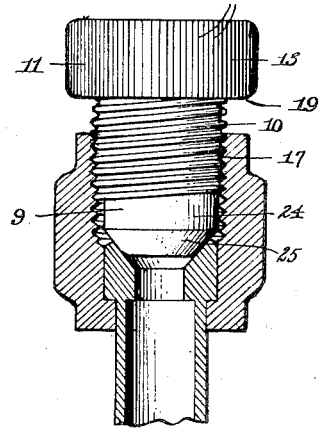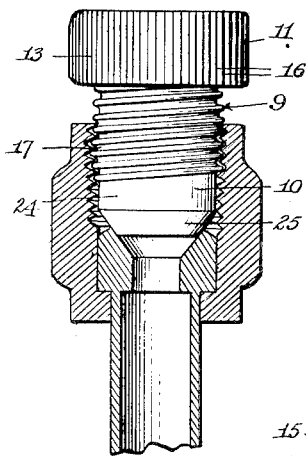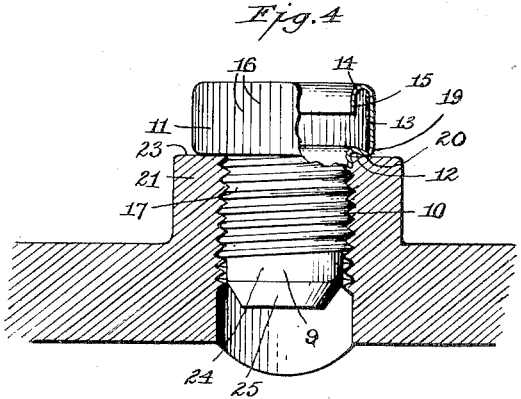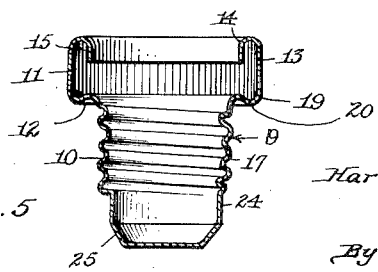
Harold P. Henderson
Inventor

United States Patent Office 2,770,260
Patented Nov. 13, 1956

2,770,260

SELF-ALINING PROTECTIVE PLUG FOR TUBINGS, HOSE LINES, THREADED OPENINGS, ETC.

Harold P. Henderson, Tonawanda, N. Y.

Application August 19, 1954, Serial No. 450,899

3 Claims. (Cl. 138—89)

This invention relates to an industrial closure, and more particularly to a self-alining protective closure plug for tubings, hose lines, threaded openings, etc.

The invention has for one of its objects to provide an inexpensive sheet metal closure plug capable of being inserted into a screw-threaded opening or passage and hand-tightened under preliminary force; the sheet metal from which the plug is constructed being of a thin yieldable material, preferably aluminum, into which a screw-thread is rolled on a cylindrical part thereof adapted to be entered in an opening or passage having a standard screw-thread cut, machined, or die-cast therein and which is capable of receiving the roll-threaded portion of the plug with a degree of looseness or freedom capable of having the axis of the plug assume a slight angle to the axis of the opening into which the plug is fitted while loosely threading the plug into the cut or machined screw-thread under initial hand force until the seat-contacting portion of the plug engages the seat of the object having the opening or passage being closed, at which time under the application of additional force the thread spirals or convolutions of the plug or a portion or portions of the same firmly engage the screw-thread in the opening being closed and become slightly distorted or deformed and automatically lock the plug so that under normal shipping or handling conditions it will not become loosened and a concentric relationship will not only have been established between the plug and the opening into which it is entered, but the circular or seat-contacting part of the plug will have concentrically engaged a more rigid part or seat of the tube, hose line, threaded opening, or the like into which the plug is entered, which part or seat may be described as having a bearing surface. And due to the thinness of the sheet material from which the plug is formed, said seat-contacting portion of the plug will conform itself around its contact region to the more rigid seat or part of the object with which it comes in contact and thus make a tight joint; in some instances externally and in other instances internally, as will appear hereinafter.

With the above and other objects in view to appear hereinafter, I have illustrated in the accompanying drawings the female member of a connector or coupling closed by my improved plug and a section of tubing or hose line to which the connector or coupling is attached; said female member being adapted for connection with the male member of the connector after removing my improved plug therefrom. The plug in one adaptation of use provides an internal seal, the tube or hose line associated therewith being held concentric in a fixed position within said female member and having a flared bearing surface or seat contacted by a correspondingly formed portion of the plug, and in another adaptation of use an external seal is provided.

Fig. 1 is a side elevation of one end of a tube or hose line adapted to be connected to some object for service, it having my improved closure plug inserted therein.

Fig. 2 is a sectional elevation of the parts illustrated in Fig. 1, the connector member or coupling and tube or hose line being shown in section and the plug in elevation.

Fig. 3 is a view similar to Fig. 2, the plug being loosely threaded or hand-tightened under initial force into the body of the connector member or coupling.

Fig. 4 is a sectional elevation of a housing or similar object having a screw-threaded opening therein and a boss surrounding the entrance to the opening.

Fig. 5 is a longitudinal section through the plug taken diametrically through the same.

Fig. 6 is an enlarged sectional view of one-half of the closure plug, showing in detail and in exaggerated form, especially as to the thinness or gauge of the sheet material forming the plug.

Fig. 7 is a view similar to Fig. 6, the plug being fully tightened within its receiving opening with the tapered or conical inner end of the plug in firm contact with the flared portion or seat formed at the terminal of the tubing, hose line or other object.

Fig. 8 is a view similar to Figs. 6 and 7, the adaptation of use of my invention therein shown being one in which the closure plug serves as an external closing or sealing element.

Referring to the drawings in detail, the numeral 9 designates my improved closure plug which is constructed of a thin flexible or pressure-yieldable sheet or strip of metal, preferably aluminum, fashioned into a cylindrical body-portion 10 of varying diameters, open at one end and closed at its other; an enlargement or head 11 being formed at the open end of said plug having a shoulder wall 12 and preferably a substantially cylindrical peripheral wall 13 which is rebent or recurved inwardly upon itself in an axial direction around its upper portion, as at 14, to form an internal apron 15 spaced from said peripheral wall. The enlargement or head serves as a finger grip for the plug and the rounding of the peripheral wall of said enlargement or head as described prevents the edge of the material from which the plug is formed coming in contact with or cutting or otherwise injuring the individual threading the plug into closing or sealing position. The rebending or recurving of the metal as described further minimizes the possibility of damaging the exposed portion of the plug when in closing or sealing position, due to its serving as a reinforcing medium; such damage being oftentimes caused through mishandling while transporting the object or part into which the plug is threaded from one place to another. The enlargement or hand grip 11 so formed also prevents the edge of the metal from catching onto other parts or objects, which may tend during transportation to cause unthreading of the plugs from their openings.

The peripheral wall of the enlargement, head, or hand grip 11 is externaly serrated or otherwise roughened, as at 16, so as to enable the user to easily grasp and manipulate the plug during the act of threading it into a tube, hose line, or opening; or during the act of unthreading the same.

The body portion of the plug varies in diameter from end to end and it has a screw-thread 17 rolled therein from the shoulder wall 12 toward its closed end, but short of the latter, and the shoulder wall, which faces inwardly, connects the roll-threaded portion 17 of the plug with the enlargement or head. This shoulder wall merges circularly around its outer region 19 into the cylindrical peripheral wall 13 of said enlargement or head and around this region it is provided with an inwardly-directed contact bead 20 for contact with an object 21 having a threaded opening 22 therein to receive the plug, as shown for example in Figs. 4 and 8 of the drawings. Such object has for such purpose an outwardly facing plug-contact region 23 surrounding the outer end of said opening and serving as a seat against which the inwardly-directed contact bead 20 of the plug is to bear; said plug-contact region or seat being disposed in a plane at a right angle to the axis of the opening into which the plug is threaded. More specifically described, the inwardly-facing pressure-yieldable shoulder wall 12 may be of substantially ogee formation radially, which increases its yieldability under force or pressure and this shoulder wall merges into the upper end of the roll-threaded portion 17 of the plug, which threaded portion may be said to be formed along the medial portion of the cylindrical plug body.

The contact bead 20 forms the outer circular region of said shoulder wall and merges into the inner circular region thereof, and upon pressure being applied to the plug when said bead is in contact with the outwardly-directed plug-contact seat 23, said wall will yield upon tightening of the plug in said threaded opening and the bead 20 thereof will conform itself to the exact formation of said seat and to any irregularities thereof.

As clearly shown in Figs. 4 and 8, the screw-thread rolled into the body portion of the plug is adapted to coact with the standard thread of a machine-threaded opening, passage or the like in an object for the purpose of completely closing or sealing said object against the admission of dust, dirt, or moisture.

The inner end portion of the plug has an unthreaded cylindrical region 24 of a diameter preferably slightly less than the maximum diameter of the thread rolled in the plug and at the extreme inner end of said plug adjacent the unthreaded cylindrical region 24 a conical or tapered portion 25 is formed, which I term a seat-contacting portion, to be utilized for internally closing or sealing the passage or opening in an object or part having an internal flared rigid plug-contact seat 26 conforming to the conical or tapered inner or closed end of the plug, as will appear hereinafter.

A flared seat in an opening or passage having a threaded wall will be found to form part of many connector members, couplings or other fittings; those herein shown being formed at the end of a hose line or tube used in refrigerating apparatus and many other places. By reason of that portion of the plug between the rolled threads therein and the conical seat thereof being reduced in diameter so as to be slightly smaller than the minimum diameter of the thread in the opening of an object to be closed, the unthreaded, or starting portion of the plug as I term it, automatically lines up the plug for proper coaction with the threads of the opening which it enters and thus eliminates any possibility of cross-threading in starting the entrance of the plug into the opening to be closed.

My improved plug may be dimensioned and proportioned at various parts thereof to fit any particular situation, and the sides of the rolled thread-spirals or convolutions are fashioned for effective cooperation with A. N. or S. A. E. fittings designed to fit screw-threaded parts of cylinders, valves, etc. and the angle of said rolled thread, which may approximate 50 degrees, will enable the thread-spirals or convolutions of the plug to coact with and conform itself to all standard types of screw-threaded objects or fittings having flared seats known to be on the market today.

The thread rolled into the plug may be of any desired pitch, depending on the pitch of the machined or cut thread in the part into which the plug is to be entered.

When threading my improved plug into the threaded opening of an object, the tolerance or looseness between the two threads enables the plug to be entered into the threaded opening under spinning movement without firm contact between the two threads and when threading said plug into an object constructed for internally closing or sealing an opening or passage, the tapered or conical seat-contacting portion 25 of the plug engages the flared rigid seat 26 within the object or fitting to be closed by the plug, the inner sides 27 of the spirals or convolutions of the cut or machined thread will be engaged by the outer side 28 of the rolled thread on the exterior of the plug with the result that increased pressure will be required to further enter the plug in the opening or passage.

Such pressure results in the surface of the conical portion 25 of the plug conforming itself, because of its flexibility, to the surface of the flared seat 26 or any irregularities thereof and at the same time the rolled spirals or convolutions on the exterior of the plug will also become deformed or distorted with the result that the plug automatically locks itself so that under normal shipping or handling conditions it will not loosen, due to the pressure of the solid or standard thread against the rolled thread causing the material of the plug, because of its thinness, bulging in parts and making it impossible to loosen the plug without the use of a suitable tool and the exertion of unusual pressure in a rotative retrograde or unthreading direction sufficient to loosen the threads of the plug from the threads of the part into which the plug was entered and locked.

When removing the plug after being tightened in place, any irregularities caused in the rolled thread under tightening action of the plug will cause a spring tension in the thin material from which the plug is formed and the plug during the act of unthreading the same under exertion of undue pressure will cause the rolled thread to be released from the cut or machined thread with a noticeable snap, after which the plug may be unthreaded by hand. Due to the slight difference in diameters of the two screw threads, the tightening of the plug, in addition to causing the rolled threads to become deformed also in some instances may cause the angularity of the conical portion 25 of the plug to be somewhat distorted under pressure, but always with assurance that a perfect seating of the conical portion against its flared seat 26 will take place and a secure fastening or locking of the plug within the threaded opening will be assured.

Because of the thinness of the material from which the plug is constructed it would be impossible to roll a thread in the plug that would fit a machine or cut thread having 20, more or somewhat less, spirals or convolutions to the inch because of the necessity of forming sharp angular grooves between the threads which would so weaken the metal or even tear the same and thus render the plug useless.

This is obviated by reason of the fact that in rolling a thread into my improved plug I provide reversely curved spirals or convolutions 29, at opposite sides of the material or the peripheral wall of the plug and I lap such spirals or convolutions to create flat spiral depressions 30 on the inner and outer sides of the metal between the outer spirals or convolutions 29 which receive between them the crests 27ª of the spirals or convolutions of the cut or machine threads. The spirals or convolutions 29 of the rolled thread on the exterior of the plug enter the spiral grooves between the spirals or convolutions of the machined thread with sufficient play between the spirals or convolutions of both threads to enable the threads of the plug to be hand spun under free movement until the shoulder wall 12 engages the contact seat 23 surrounding the open end of the cut or machine threaded opening in one instance; and in the other instance, until the conical or tapered portion 25 of the plug engages the rigid flared seat 26, after which the outer sides or bevels 28 of the spirals or convolutions 29 of the thread rolled exteriorly on the plug engages the inner sides or bevels 27 of the spirals or convolutions of the standard thread in the opening or passage to be closed. Upon further tightening the plug, and using the same as an external seal or closure the shoulder wall 12 is flexed by utilizing the inwardly-directed bead 20 thereof as a fulcrum and during such action and at all times during the tightening of the plug within its opening, comparatively small spiral areas of the machine cut spirals or convolutions contact the outer sides 28 of the rolled spirals or convolutions causing the thin material from which the plug is constructed to become deformed at such spiral contacting regions and at the same time assuring a firm seating of the contact bead 20 with the contact face or seat 23 at the outer end of the threaded opening, or a firm contact of the conical portion 25 of the plug with the internal flared seat 26 of the object, fitting or coupling into which the plug is threaded.

By constructing the rolled threads in the manner described a firm screw-thread can be rolled in the metal with assurance of strength sufficient at all points of the thread that even though 20 or more spirals or convolutions per inch were rolled, the part in which the rolled spirals or convolutions were formed would remain in rigid connection with the correspondingly pitched cut or machined thread and uniform thickness of metal would be assured from end to end of the screw-thread.

If desired the recurved or rebent portion of the cylindrical wall of the enlargement or head of the plug forming the apron within said enlargement or head could be shaped otherwise than cylindrical. For example, this apron could be formed to serve as a wrench socket which would facilitate the tightening of the plug into an opening or passage without any possibility of deforming the exterior of the head or enlargement, as may happen were a wrench or other tool to be applied to the exterior surface of the head or enlargement; or if desired the exterior of the head or hand grip 11 may be made non-cylindrical for coaction with a tool having a correspondingly shaped part to engage the head or hand grip.

Inasmuch as industrial closure-plugs of the kind described are made in various sizes, the gauge of the metal used to form the plugs will in a measure depend on the diameter of the closure plug and sometimes the length of the plug is a determining factor.

Having thus described my invention, what I claim is:

1. In combination with an industrial object having an opening or the like and a flared plug-contact seat therein, said plug being formed of thin sheet or strip metal into a cylindrical body portion open at one end and closed at its other and having a cylindrical enlargement at its open end to form a radial inwardly-facing shoulder wall connecting the peripheral wall of said cylindrical body portion with the peripheral wall of said enlargement, said cylindrical body portion having a screw-thread rolled externally therein extending from said shoulder wall towards said closed end, said body portion terminating in a tapered portion at its closed end having a wall flexible under force applied to said plug when tightened in said opening to conform to said seat, the peripheral wall of said body portion having a smooth unthreaded surface adjacent said tapered portion and the latter when seated against said seat conforming itself to the latter when said plug is tightened in said opening.

2. In combination with an object having an opening provided with a standard screw-thread and a plug-contact seat a distance from the outer end of said opening, a cylindrical closure plug having a thread rolled into its peripheral wall pitched to the pitch of said standard screw-thread and having a seat-contacting portion, said screw-threads being sized relatively to permit spinning inward movement of said closure plug into said opening until in contact with said plug-contact seat, said rolled screw-thread being deformable under tightening action of said closure plug into said opening so as to lock said plug in said opening.

3. In combination with an object having an opening therein and a screw thread machined in the wall of said opening, a generally cylindrical closure plug for externally or internally closing an opening in said object, said closure plug being formed of thin flexible material fashioned to provide a cylindrical body portion having a screw-thread rolled into its peripheral wall and having means at one end thereof for internally closing the opening in said object provided with a machined screw-thread and adjacent its other end with means to externally close said opening, said machined screw-thread engaging and deforming said rolled screw-thread to lock said plug in said opening after internally or externally closing said opening.

References Cited in the file of this patent
UNITED STATES PATENTS

| | | |
|---|---|---|
| 839,090 | Ayer | Dec. 25, 1906 |
| 2,627,877 | Phillips | Feb. 10, 1953 |
| 2,632,478 | Ronfeldt | Mar. 24, 1953 |
| 2,669,469 | Finch | Feb. 16, 1954 |